US006801649B1

(12) United States Patent
Michael et al.

(10) Patent No.: US 6,801,649 B1
(45) Date of Patent: Oct. 5, 2004

(54) METHOD AND APPARATUS FOR DETERMINING A REFERENCE POINT OF A BOTTLE BOTTOM IN AN IMAGE

(75) Inventors: David J. Michael, Framinghan, MA (US); Juha Koljonen, Needbon, MA (US); Paul Dutta-Choudhury, Franklin, MA (US)

(73) Assignee: Cognex Corporation, Natick, MA (US)

( * ) Notice: Subject to any disclaimer, the term of this patent is extended or adjusted under 35 U.S.C. 154(b) by 717 days.

(21) Appl. No.: 09/772,751

(22) Filed: Jan. 30, 2001

Related U.S. Application Data

(63) Continuation of application No. 09/086,326, filed on May 28, 1998, now Pat. No. 6,249,602.

(51) Int. Cl.$^7$ ................................................. G06K 9/00
(52) U.S. Cl. ........................ 382/142; 382/141; 382/168
(58) Field of Search ................................. 382/141, 142, 382/143, 168, 169, 170, 286, 288; 348/127

(56) References Cited

U.S. PATENT DOCUMENTS

| | | | |
|---|---|---|---|
| 5,204,911 A | * | 4/1993 | Schwartz et al. ........... 382/142 |
| 5,278,983 A | | 1/1994 | Kawabe et al. |
| 5,548,326 A | | 8/1996 | Michael |
| 5,550,763 A | | 8/1996 | Michael et al. |
| 5,581,632 A | | 12/1996 | Koljonen et al. |
| 5,818,443 A | * | 10/1998 | Schott ........................ 382/141 |
| 5,848,181 A | * | 12/1998 | Ogata ........................ 382/169 |
| 5,901,241 A | | 5/1999 | Koljonen et al. |

OTHER PUBLICATIONS

COGNEX 3000/4000/5000, Image Processing, "Labeled Projection Tool", Chapter 7, pp. 354–366 (1996).

* cited by examiner

Primary Examiner—Yon J. Couso
(74) Attorney, Agent, or Firm—Tracy Calabresi

(57) ABSTRACT

An efficient and reliable method and apparatus is disclosed that finds a reference point of an object profile within an image when the object is of an unknown size. The object profile is modeled using a synthetic labeled-projection model, which in conjunction with the image, is projected over a portion of the image of the object profile to derive a histogram. The histogram is normalized and a maximum of a first derivative of the histogram is defined for that position. The position of the labeled-projection model is moved relative to the image, and the process is repeated until a selected portion of the image has been examined. The first derivative of the normalized labeled projection is greatest when a feature of the image and the feature denoted by a specific synthetic label of the labeled-projection model are aligned. The method and apparatus can locate the center of the object with reliability, because use of the labeled-projection model and the histogram minimizes the * effects of image artifacts. Further, the method decreases computational time, and thus, increases performance speed.

39 Claims, 16 Drawing Sheets

| 8 | 7 | 7 | 6 | 5 | 5 | 5 | 6 | 7 | 7 | 8 |
|---|---|---|---|---|---|---|---|---|---|---|
| 7 | 6 | 6 | 5 | 4 | 4 | 4 | 5 | 6 | 6 | 7 |
| 6 | 5 | 5 | 4 | 3 | 3 | 3 | 4 | 5 | 5 | 6 |
| 6 | 5 | 4 | 3 | 2 | 2 | 2 | 3 | 4 | 5 | 6 |
| 5 | 4 | 3 | 2 | 1 | 1 | 1 | 2 | 3 | 4 | 5 |
| 5 | 4 | 3 | 2 | 1 | 0 | 1 | 2 | 3 | 4 | 5 |
| 5 | 4 | 3 | 2 | 1 | 1 | 1 | 2 | 3 | 4 | 5 |
| 6 | 5 | 4 | 3 | 2 | 2 | 2 | 3 | 4 | 5 | 6 |
| 6 | 5 | 5 | 4 | 3 | 3 | 3 | 4 | 5 | 5 | 6 |
| 7 | 6 | 6 | 5 | 4 | 4 | 4 | 5 | 6 | 6 | 7 |
| 8 | 7 | 7 | 6 | 5 | 5 | 5 | 6 | 7 | 7 | 8 |

FIG. 6A

| 90 | 90 | 90 | 90 | 90 | 90 | 90 | 90 | 90 | 90 | 90 |
|----|----|----|----|----|----|----|----|----|----|----|
| 90 | 90 | 90 | 90 | 1  | 1  | 90 | 90 | 90 | 90 | 90 |
| 90 | 90 | 1  | 1  | 5  | 5  | 1  | 1  | 90 | 90 | 90 |
| 90 | 1  | 5  | 5  | 90 | 90 | 5  | 5  | 1  | 90 | 90 |
| 90 | 1  | 5  | 90 | 90 | 90 | 90 | 5  | 5  | 1  | 90 |
| 1  | 5  | 90 | 90 | 70 | 70 | 90 | 90 | 5  | 1  | 90 |
| 1  | 5  | 90 | 90 | 70 | 70 | 90 | 90 | 90 | 1  | 90 |
| 1  | 5  | 90 | 90 | 90 | 90 | 90 | 90 | 5  | 1  | 90 |
| 90 | 1  | 5  | 90 | 90 | 90 | 5  | 5  | 1  | 90 | 90 |
| 90 | 90 | 1  | 5  | 90 | 90 | 5  | 1  | 90 | 90 | 90 |
| 90 | 90 | 90 | 90 | 1  | 1  | 90 | 90 | 90 | 90 | 90 |

FIG. 6B

METHOD AND APPARATUS FOR DETERMINING A REFERENCE POINT OF A BOTTLE BOTTOM IN AN IMAGE

This case is a continuation of U.S. patent application Ser. No. 09/086,326 filed May 28, 1998 now U.S. Pat. No. 6,249,602.

FIELD OF THE INVENTION

This invention relates to machine vision, and particularly to determining a reference point, such as the center, of an object profile of unknown size but known shape using a machine vision system.

BACKGROUND

It is known in the machine vision industry how to search for an object of a known size and shape in an image. Such techniques are used to align a template of the object with the image of the object so that further processes can inspect portions of the object, such as printing on the surface of the object, roundness of the object, or the presence/absence of a pill contained in the object.

Here, an image is a rectangular, two-dimensional array of grey values, where each element in the array is called a pixel. A template is similar to an image, except that it need not be rectangular, or even simply connected, i.e. it may consist of a collection of disjoint regions. A template is similar to an image also in that each element of the template is assigned a grey value.

In general, the methodology for searching for an object of known size and shape in an image is to first construct the template of the object; then search a likely area of the image of the object for the portion of the image to which the template is most similar. Various methods, such as that taught in U.S. Pat. No. 5,548,326 Efficient Image Registration, have been developed to improve the efficiency of such searches.

Once the object is found, it can be said to be aligned with respect to the template. Alignment shall be defined as orienting the object with respect to the template to make at least one alignment parameter of the object, such as the planar position, substantially equal to the corresponding alignment parameter of the template. After alignment, commonly, the machine vision system returns a metric representative of the goodness of fit, a measure of the aggregate deviations of the actual object from the template.

However, when the size of the object to be found is unknown, the known search techniques have had to be modified to include multiple templates of various sizes. Multiple templates are needed because typically such techniques search for objects that are the same size as the template. The techniques typically compare pixels of the image to elements of the template for a match. Thus, the pixel values of the image and the elements of the template will not correspond unless an appropriately scaled template with appropriate number and arrangement of elements is used. However, it is not always possible to know which sizes of the template are required for effective searching.

The possibility of flaws in the object further diminishes the usefulness of current search techniques for objects of an unknown size. Under such circumstances, known techniques take an unacceptably long time. Further, even when given a longer time to search, known techniques have difficulty distinguishing between a perfect but differently sized object, and a flawed but correctly sized object.

SUMMARY

An efficient and accurate alignment method and apparatus provides the position of a reference point, such as the center, of an "object profile", even when an exact size of the object, and thus the size of the profile of the object, is unknown. The method generates a synthetic labeled-projection model based upon the "object profile" to be found, acquires an image of the object, and defines a window to enclose at least a portion of the image. The image is evaluated by performing a normalized labeled projection of the image of the object using the model of the object at each location in the image within the window, which generates a histogram of the image for each location. The histogram is a representation of all pixels in the image that are similarly labeled in the labeled-projection model. Next, the histogram is differentiated and the maximum absolute value is noted for each location. Thereafter, a comparison can be made between the maximum absolute values of the first derivative of each of the locations. Ultimately, the peak of the maximum absolute values of the first derivative is determined. The position of the labeled-projection model associated with the peak provides the position of the reference point of the "object profile." More particularly, the position of the center of the labeled-projection model associated with the peak is the position of the center of the "object profile."

The first derivative of the histogram is greatest when a feature of the image, such as the "object profile", is aligned with a feature denoted by a specific label of the labeled-projection model, such as the shape of the "object profile." Therefore, the method uses the peak of the all the histogram's first derivatives to find the reference point of the "object profile". Since flaws in the object will rarely align with labels of the labeled-projection model, the flaws will not significantly effect finding the reference point of the "object profile". Moreover, the labeled-projection model is labeled such that "object profiles" of varying sizes can be found.

Not only can the "object profile" be found despite flaws and unknown size, but the reference point of the "object profile" can also be found efficiently. In one embodiment, more than one window is defined to reduce the area of the image at which the normalized labeled projection must be performed for each position of the labeled-projection model, thereby, enhancing efficiency. The multiple windows of this embodiment enclose a smaller area of the image than the single window of the previous embodiment. Although a smaller area is searched for each normalized labeled projection, the "object profile" is identified because the smaller windows are defined to enclose enough of the "object profile" within the windows. Thus, use of more than one small window enhances the efficiency of the method and apparatus by decreasing the number of computations required without substantially decreasing reliability.

In a preferred embodiment, the number of times the labeled-projection model is moved with respect to die image is decreased to enhance efficiency. Two or more one-dimensional searches are used to increment the labeled-projection model's position as opposed to an area search of an alternative embodiment.

In particular, when there is greater uncertainty about the size of objects to be inspected, the invention obtains more accurate and faster results than known methods, which is advantageous in many inspection applications.

BRIEF DESCRIPTION OF THE DRAWINGS

The invention will be more fully understood from the following detailed description, in conjunction with the accompanying figures, wherein:

FIG. 1b is a footprint of the container of FIG. 1a;

FIG. 6a is an illustration of a circular labeled-projection model;

FIG. 6b is an illustration of an image that includes a circle;

FIG. 6c is an illustration of a histogram resulting from the normalized labeled projection of the image of FIG. 6b using the labeled-projection model of FIG. 6a;

FIG. 8 includes illustrations of three relationships between an image and a labeled-projection model.

FIG. 9a is an illustration of the histogram of the normalized labeled projection of FIG. 8a;

FIG. 9b is an illustration of the first derivative of FIG. 9a;

DETAILED DESCRIPTION OF THE DRAWINGS

Figure 1A:
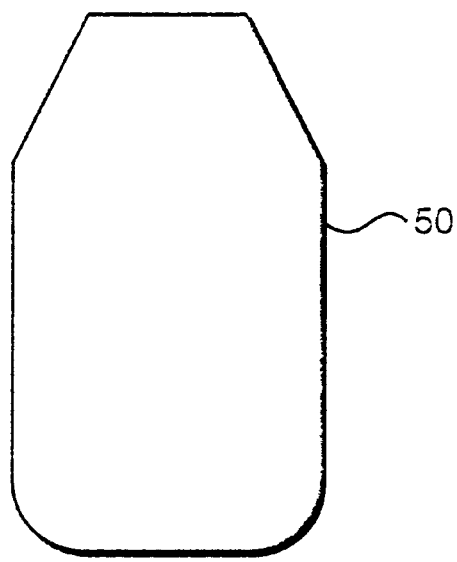
FIG. 1a is a side profile of a container.
Figure 1B:
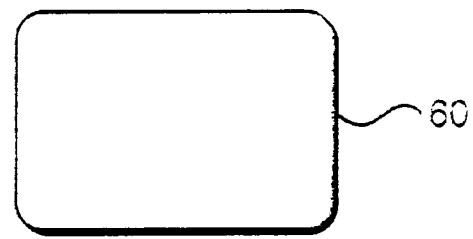

When locating an object in an image of the object and surroundings, many details, such as the ornamentation of the object, can be ignored. An object profile 50 or side silhouette, as illustrated in FIG. 1a, is useful in applications where determining the height of the object is significant, for example. An outline of the object bottom 60 called a "object footprint", as illustrated in FIG. 1b, is useful in applications where determining the center of the object is desired. Further features of the object are not needed for such applications.

Figure 2:
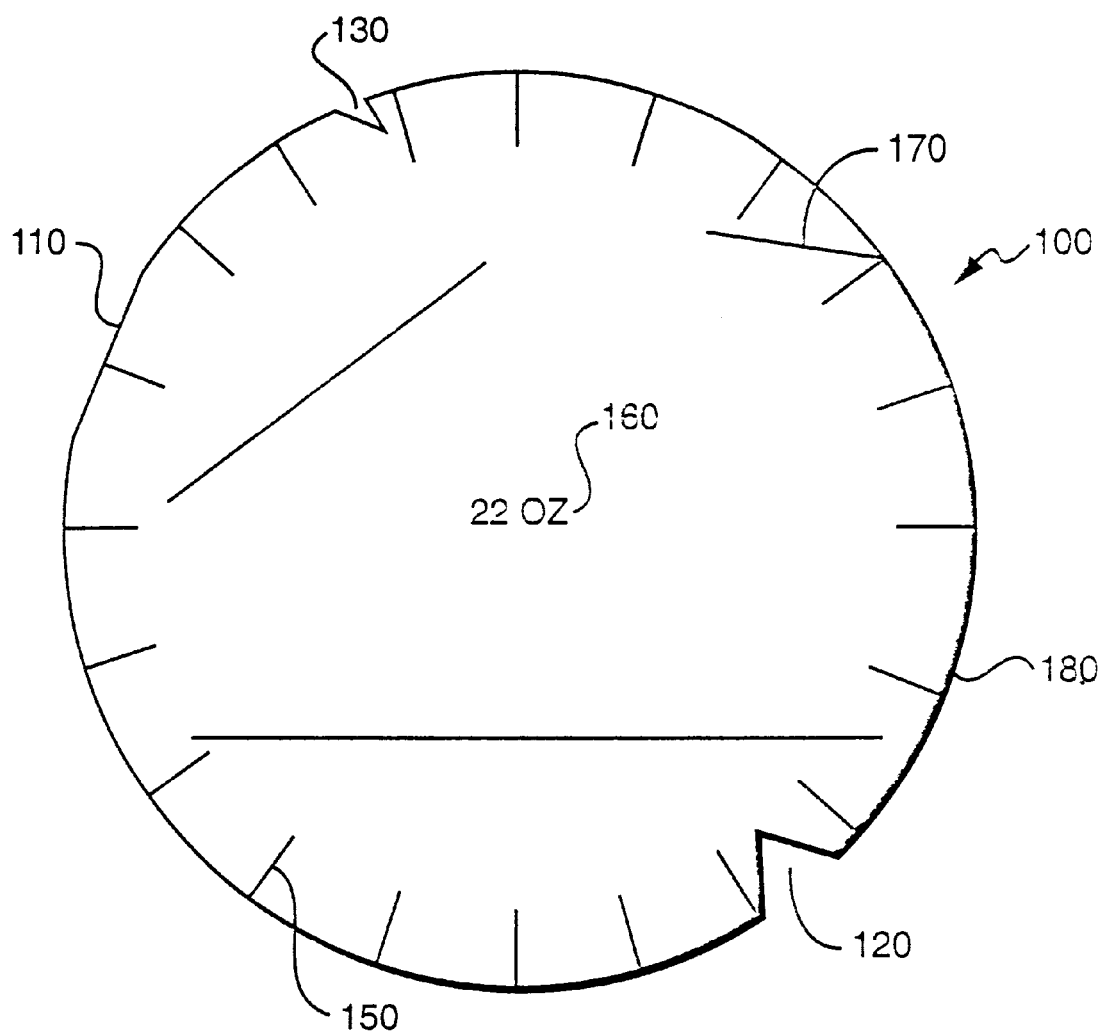
FIG. 2 is a representation of an image of a container bottom showing a substantially round footprint plus other image details.
Figure 3:
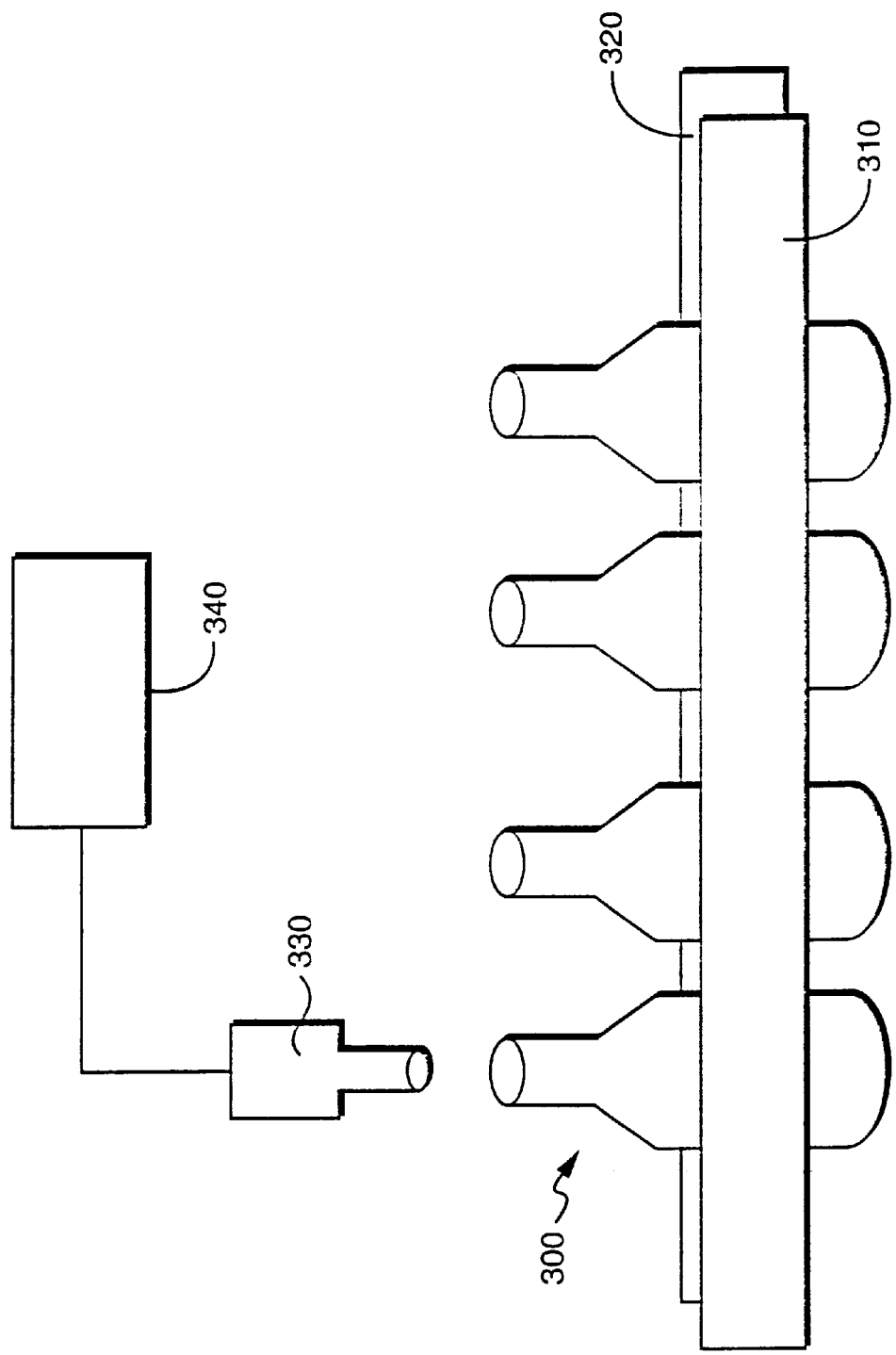
FIG. 3 is a representative side view of a container inspection conveyer line.

An example of such an application is illustrated in FIG. 3 which is a representative side view of a container inspection line. In this application, containers 300, of the same shape, but of unknown size, are transported horizontally by supporting belts 310 and 320. In one implementation, camera 330 is positioned vertically over the area between the supporting belts 310 and 320. The camera 330 is triggered so that each image transmitted to machine vision system 340 contains a view through a container neck. The image acquired is of a container bottom, an example of which is illustrated in FIG. 2.

It is desirous to minimize or avoid the effects of artifacts in the image of a container bottom. Otherwise, such artifacts can distract a machine vision system from finding a rim of the object. In turn, this can result in a failure by the machine vision system to find the center of the "object profile" within required performance times.

The representation of an image of a container bottom 100 illustrates that the image can have many artifacts that can distract a machine vision system from finding a rim 180 of the container bottom 100. For example, cuts 130, nicks 110, and gouges 120 on the edge of the rim 180 cause the actual shape of the rim 180 to diverge from the expected shape, which in this representation is a circle. Scratches 170, both fine and coarse, can show up as lighter or darker areas. Moreover, features molded into the container can be concentric with the rim 180 and may consequently act as a false target for the rim 180, thereby making determination of the radius unreliable, while still allowing determination of the center. Stabilizing bumps 150 and writing 160 may be molded into the container bottom 100 introducing further distracting image data. Lastly, the rim 180 itself may be rounded or beveled such that the edge is blurred, further degrading the information that can be used to find the rim 180. The method of the invention minimizes the effect of the artifacts on locating the center of the "object profile," as is described hereinafter.

The shape or outline of a surface(s) of the object is herein termed an "object profile," where the surface(s) of the object include, for instance, a side surface, a bottom surface, a top surface, surfaces near the top in combination with the top surface, or surface(s) of a composite object. Using the container whose image is illustrated in FIG. 2 as an example, its object profile may include only the lowermost surface, such as the surface that touches a crate when the container is packaged. In such an instance, the object profile would be the stabilizing bumps 150. However, in another application, for example, the object profile may be the rim 180 of the container in combination with the stabilizing bumps 150 even though the stabilizing bumps 150 and the rim 180 are at different planes with respect to a datum, such as the crate. Both these examples, however, have an object profile that has a substantially circular shape. Thus, what constitutes the object profile depends upon the particular application and the particular strategy chosen to image the object.

The strategy chosen to image the object may also include using equipment or preprocessing the image to minimize environmental effects on the image. For example, a high-pass filter could remove variations in grey-level caused by irregular lighting, while substantially preserving the grey-levels associated with representing the image.

Figure 4:
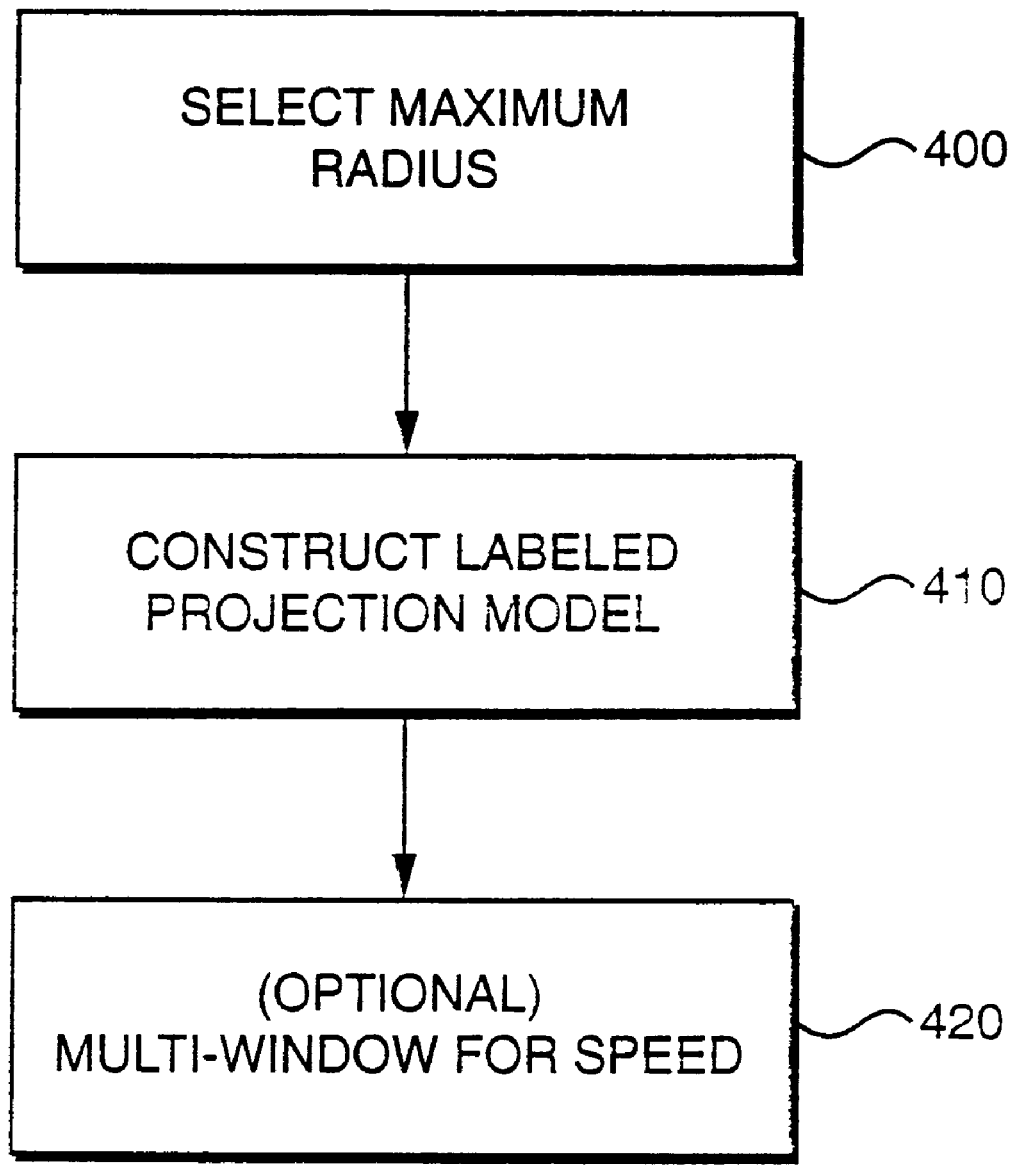
FIG. 4 is a flowchart of the training operation of one embodiment of the invention for training on a container profile having a radius.

Before any alignment can be performed, the machine vision system must be trained. FIG. 4 illustrates the training operation of one implementation of the invention in which reference numbers in parenthesis are denoted to show steps of operation. The implementation illustrated is for a container bottom that can be defined by a radius. First, the operator inputs the maximum radius of the container bottoms (400). The container bottom can be multiple sizes, but the largest size is limited by the maximum radius. The possible sizes of the container bottom are divided into to discrete scales, where each scale is defined by its radii, and limited at the furthest most point by the maximum radii. Then, each scale is assigned a different label, and the labels form a labeled-projection model (410). Optionally, the labels for a portion of the possible radii can be set to don't cares to enhance efficiency as is described with reference to FIG. 7. Given that the container bottom can be represented by the radii, the labeled-projection model can find container bottoms substantially equal to or smaller than the maximum radius. The labeled-projection model can be represented as a formula or graphically having an origin.

Figure 12:
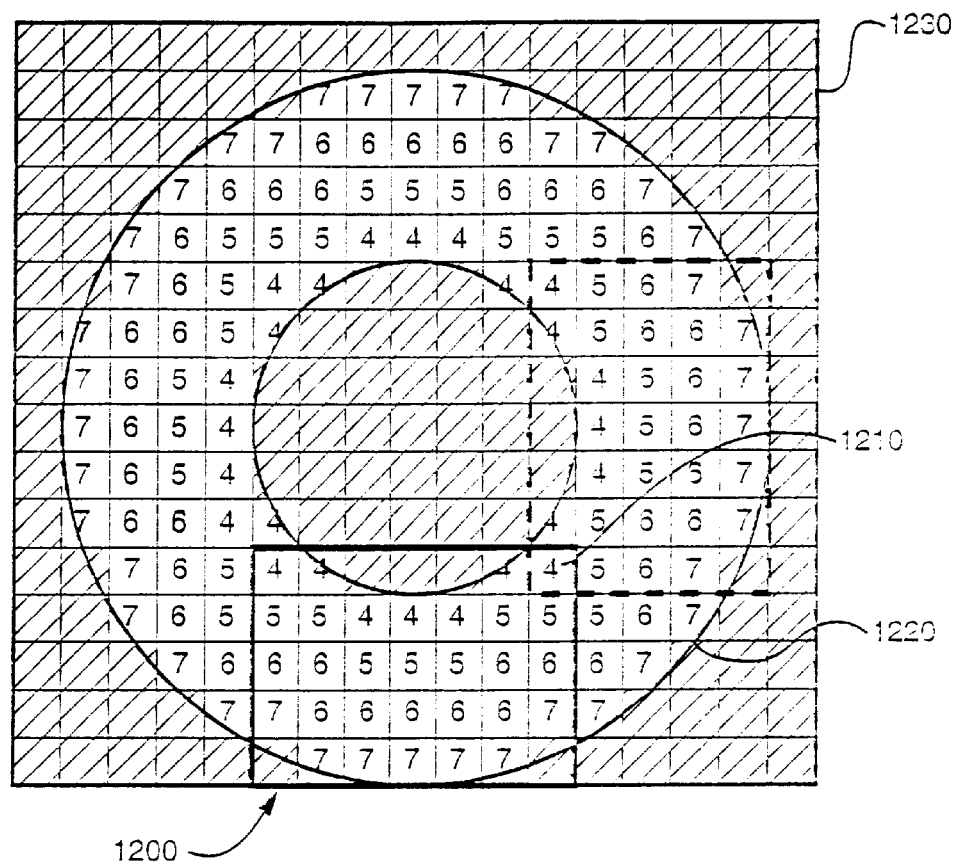
FIG. 12 is an illustration of a multi-windowed projection instance, where the area of the image on which the normalized labeled projection will be performed has been reduced to the area within the windows. The labeled-projection model of FIG. 7 is shown located at the proper location relative to the windows.

Further, for improved speed, the labeled-projection model can be windowed (420), an example of which is discussed with reference to FIG. 12.

Figure 5:
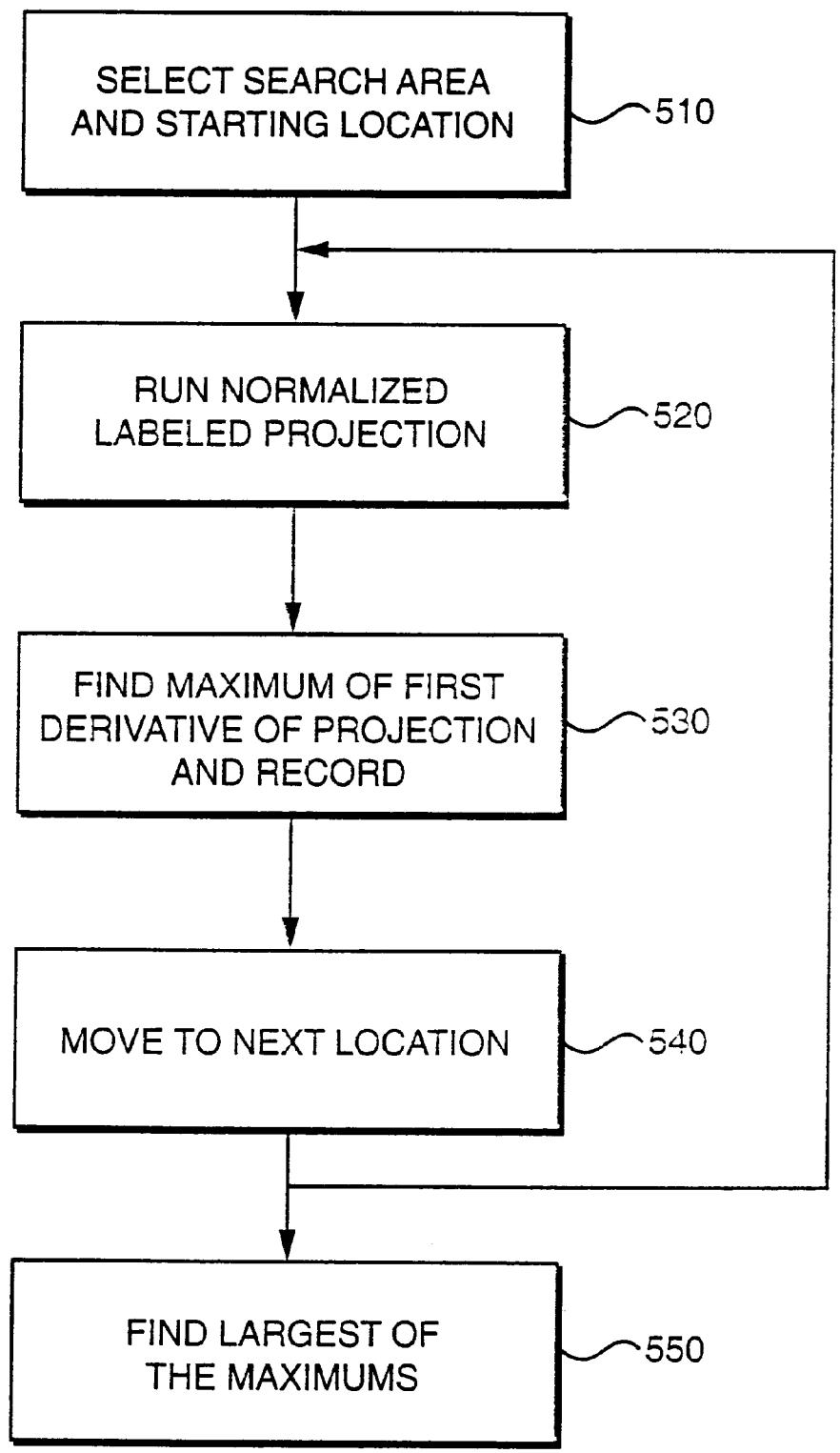
FIG. 5 is a flowchart of the run-time operation of one embodiment of the invention.

After training, run-time operation can begin. Run-time operation of one embodiment of the invention is illustrated by FIG. 5 in which reference numbers in parenthesis are denoted to show steps of operation.

First, limits of a search area and a starting location of the labeled-projection model relative to the image are selected (510). If the physical configuration of the operation constrains the variation of the object profile in one dimension, the selection of the search area and sing location incorporates such information into the method. For example, in the container inspection application illustrated in FIG. 3, the position of the containers 300 in the dimension orthogonal to the supporting belts 310 and 320 is approximately fixed by the position of the supporting belts 310 and 320, while the position of the containers 300 in the direction of travel is less constrained. Thus, in that example, a search area would have a restricted dimension orthogonal to the supporting belts 310 and 320. More generally, the search area can be constructed to have a restricted dimension in the same direction as the configuration constraint, and the starting location can be selected accordingly.

If there is no knowledge of the location in the image of the object profile, an exhaustive search could be conducted. An exhaustive approach would evaluate every possible location in the image and thus a preferred starting location is unnecessary.

The next step is to perform a normalized labeled projection (520). The normalized labeled projection uses the labeled-projection model created during training in conjunction with the image. Normalized labeled projection is described in further detail in commonly assigned, U.S. Pat. No. 5,901,241 *Entitled Labeled Projection of Digital Images*. The normalized labeled projection transforms a two-dimensional representation of the image into a histogram, which is a one-dimensional representation of the image. A histogram is defined generally as a frequency distribution graph of a set of numbers, while the histogram here is a normalized sum of the grey values of all pixels in the image that are similarly labeled in the labeled-projection model. The normalized labeled projection divides the sum in each bin, found along one dimension of the histogram by the number of elements in the labeled-projection model that contribute to that bin. This value is graphed on the x-axis of the histogram. The histogram illustrates, therefore, the average grey-level for any labeled bins. For some applications, the normalization of the histogram is optional. However, the consequent results would usually not be as accurate. As such, normalization is preferred.

FIG. 6a is a graphical illustration of a labeled-projection model 600 that can be used to search for objects with a circular profile. Labels 602 are arranged as circles. In the labeled-projection model 600, substantially all elements 604 that share a common radius from the center of the labeled-projection model are labeled identically. The dimensions of the elements 604 substantially correspond to that of a pixel in the image that is being projected. Assume that an image 608 being projected, is like the one in FIG. 6b, having a circular feature 610 of a particular grey-level. When the labeled-projection model 600 and the image 608 are aligned, a noticeable change, such as a peak or a minimum, in the histogram is expected near the bin equal to the radius of the circular feature 610 because the pixels contributing to that bin have a uniform grey-level.

Figure 6C:
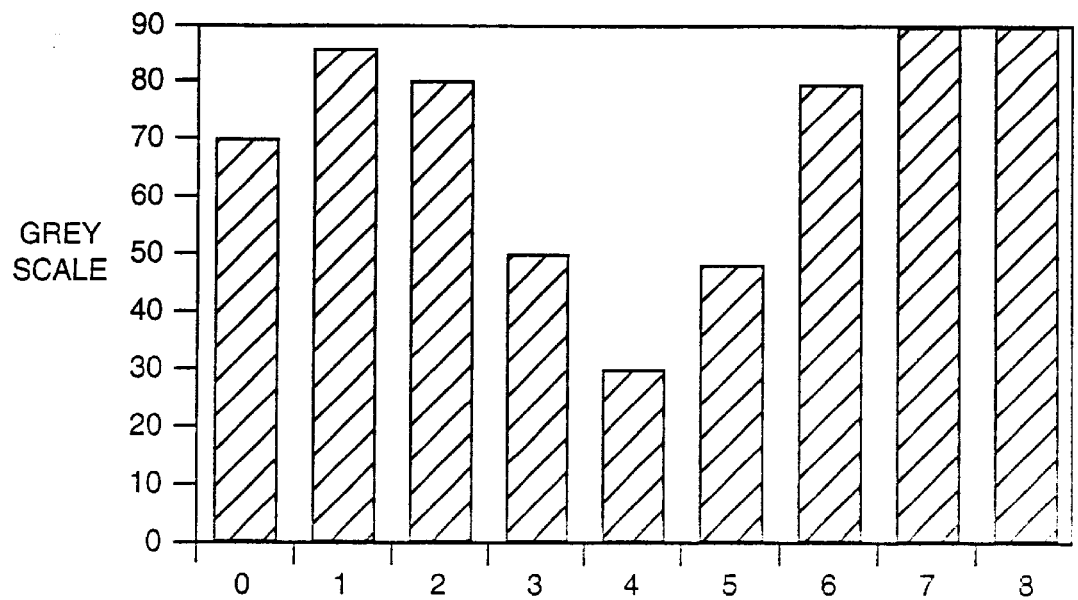

In FIG. 6b, pixel values are shown that represent a bright background 620 surrounded by a dark circular feature 610 that encloses a slightly lighter space 630 between the circular feature 610 and an inscribed square 640. The inscribed square 640 is as light as the bright background 620 except for a darker spot 650 in the middle. FIG. 6c illustrates the histogram that results from performing the normalized labeled projection the image of FIG. 6b using the labeled-projection model of FIG. 6a.

Figure 6D:
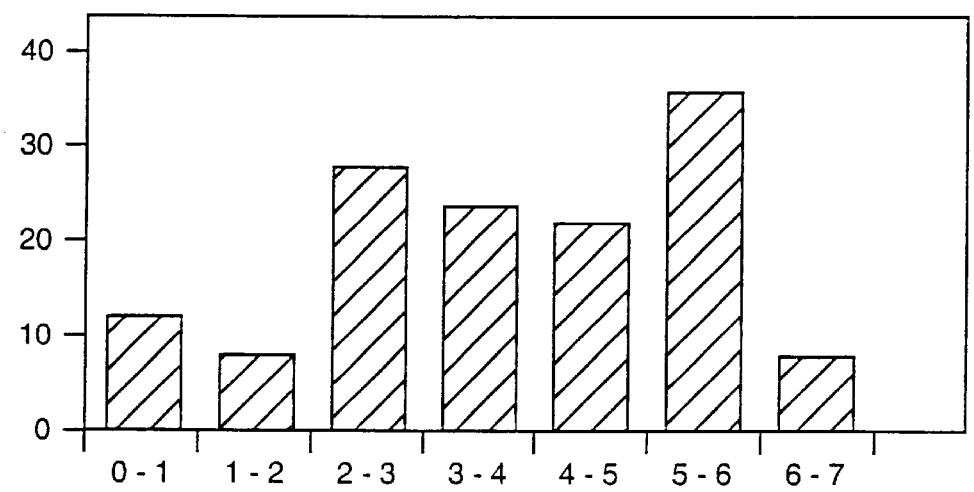
FIG. 6d is an illustration of the absolute value of the first derivative of the histogram of FIG. 6c.

Looking at the histogram before differentiation, the normalized grey scale is the lowest at the fourth bin, corresponding to the fourth element of the model 600. Knowing that the circular feature 610 is dark, a casual observer might decide hat the bin on the histogram indicating the lowest normalized intensity corresponds to the dark circular feature 610, and therefore that the circular feature 610 has a radius of 4 pixels as indicated by the fourth bin. However, the first derivative of the histogram, as is illustrated in FIG. 6d, is largest between a radius of 5 to 6 pixels. Thus, the method has determined the radius of the object profile.

The first derivative of the histogram generated by the normalized labeled projection is greatest when a feature of the image and the feature denoted by a specific label of the labeled-projection model are aligned. Thus, the circular feature 610 can be found without knowing its grey-level, nor incorporating the grey-level into the labeled-projection model. Moreover, as artifacts in the image are not denoted by a specific label of the labeled-projection model, the artifacts do not distract the method from finding the object profile within the image.

Finding the first derivative or finding a finite difference is one method for locating positions in the histogram where the averaged normalized pixel intensity changes rapidly. Alternatively, other methods can be used to achieve the same result, such as, finding signal energy of the histogram, or contrast within the histogram.

Figure 7:
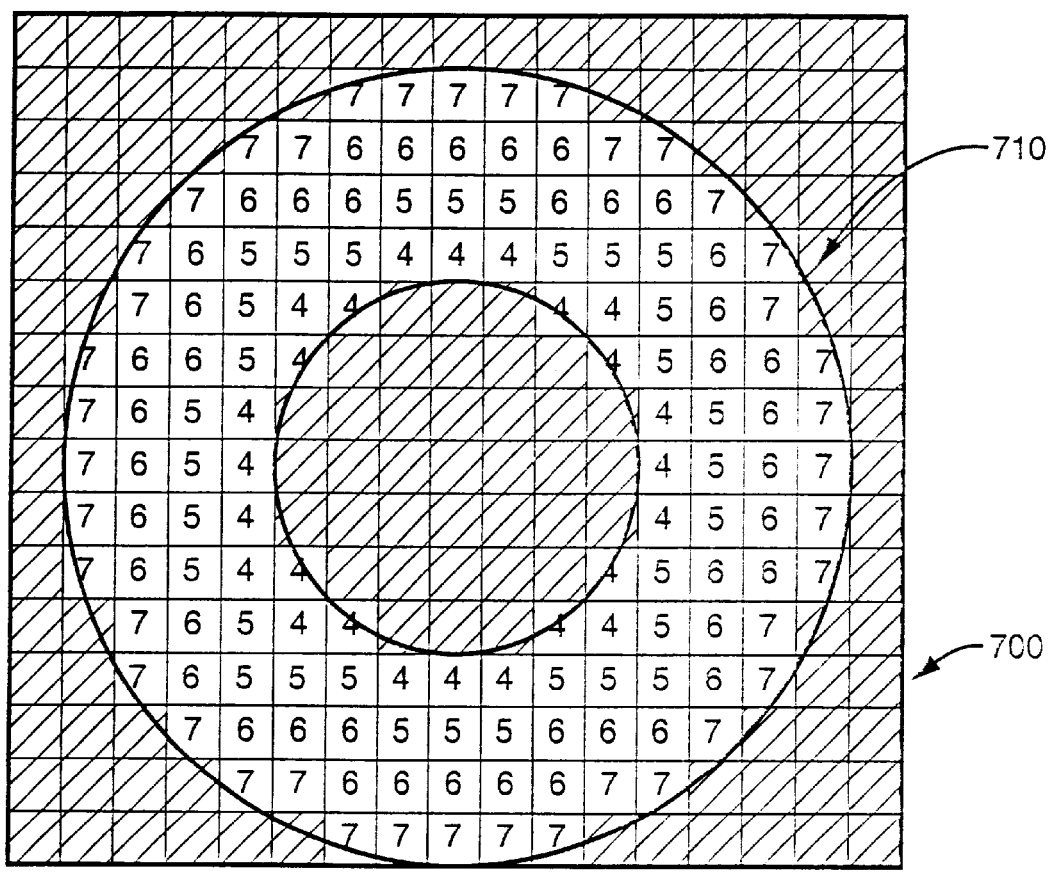
FIG. 7 is an illustration of a labeled-projection model for a container bottom that could be used in the invention.

FIG. 7 shows an illustration of a labeled-projection model 700 of a container bottom, such as one used with the invention. Here, the user specified that the radius of the container bottom varied between 4 and 7 pixels. While a radial-projection model would have labeled all of the pixels in the labeled-projection model of the invention, all pixels substantially not contained in the annulus bounded by the specified radii are regarded as don't care's 710. The value of the pixels corresponding to the elements labeled as don't cares are not summed as part of the projection. Therefore, the don't care labels save processing time. Moreover, as the labeled-projection model has an annulus that covers all expected ranges of the radius, object profiles within that range can be found with a single labeled-projection model instance.

Returning to FIG. 5, a normalized labeled projection operation is run on the image (520) using the labeled-projection model, yielding the histogram. The first derivative of the histogram is defined (530) and the value of the absolute maximum value of the first derivative is recorded for this location of the labeled-projection model.

Then, the labeled-projection model is moved relative to the image to a next location (540), and the operations (520), (530) are performed again. Once the normalized labeled projection has been performed for each of the relevant next locations, the set of recorded values of the maximum absolute value of the first derivative is examined. The position yielding the largest of the maximums is selected (550), and the center of the labeled-projection model at that position is reported as the center of the object profile.

The center of the object profile is reported in pixels, and it corresponds to the center of the model at the position yielding the largest maximum absolute value. In applications where further precision of the center of the object profile is required, using peak detection on the set of maximum absolute values can refine the position of the center.

Figure 14:
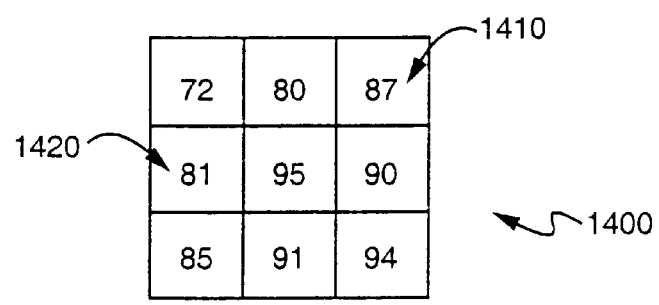
FIG. 14 is an illustration of a histogram maximum space upon which a peak is found corresponding to the reference point of an object profile.

One example is finding a peak of the set of maximum absolute values stored in a histogram maximum space as is illustrated in FIG. 14. Each maximum 1410 in the histogram maximum space 1400 is the maxima of one labeled projection. Each maximum is stored in the space according to a constant convention. For instance, the maxima 1410 of each labeled projection are recorded in the histogram maximum space at the position of the center of the labeled-projection model.

Using this convention, the peak of the histogram maximum space is found by finding local maxima and interpolating between each local maxima, such as element "95", and its nearest neighbors 1690, such as elements "72", "80", "87", "81", "90", "85", "91", and "94", to define the reference point, or is found by fitting a curve to the local maxima separately in two dimensions and interpolating between these two, for example. As the dimensions of the pixels do not limit these methods, the peak is also not limited by the dimensions of the pixels and can be reported with greater resolution.

Figure 8A:
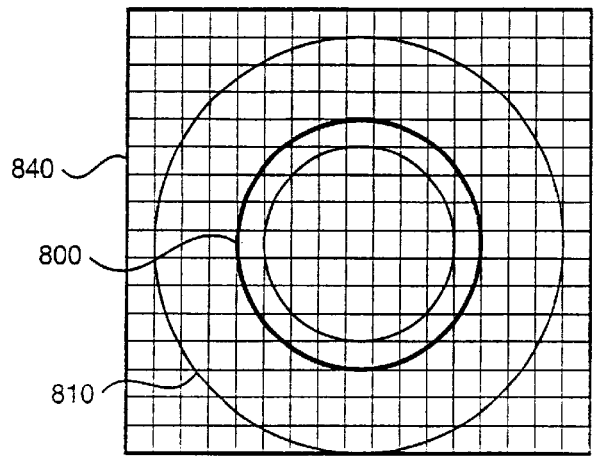
FIG. 8a illustrates the relationship where the center of the labeled-projection model is positioned at the center of the image.
Figure 8B:
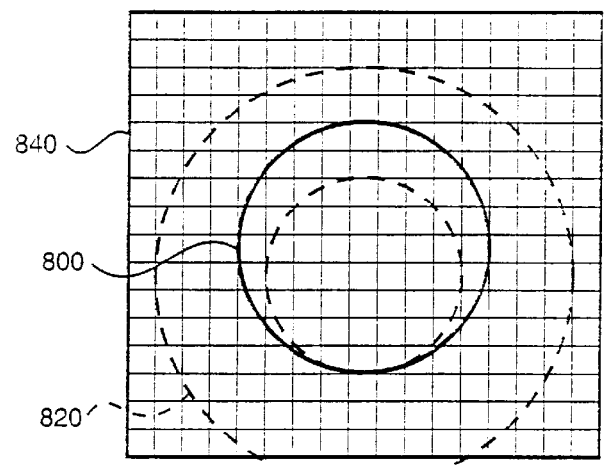
FIG. 8b is an illustration of the relationship where the center of the labeled-projection model is positioned at the correct x-location of the image, but at a y-location below the center of the image.
Figure 8C:
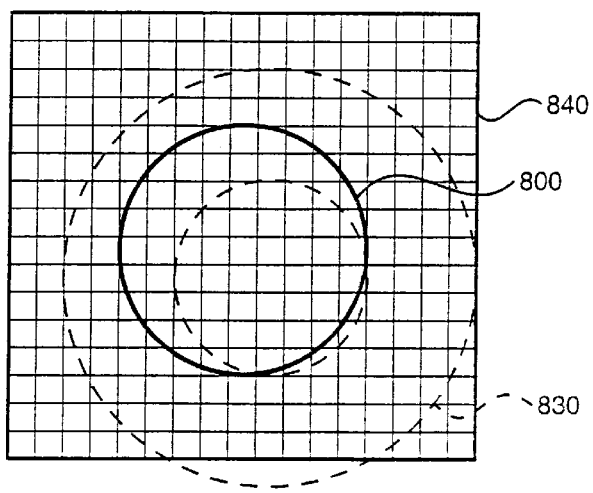
FIG. 8c is an illustration of the relationship where the center of the labeled-projection model is positioned below and too far to the right of the center of the image.
Figure 9A:
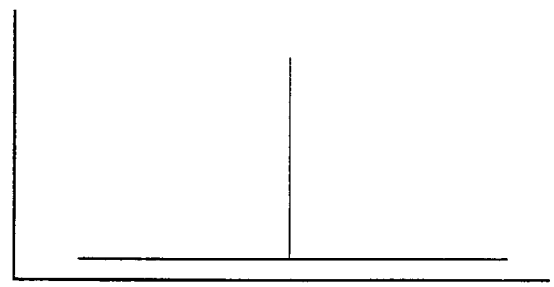
Figure 9B:
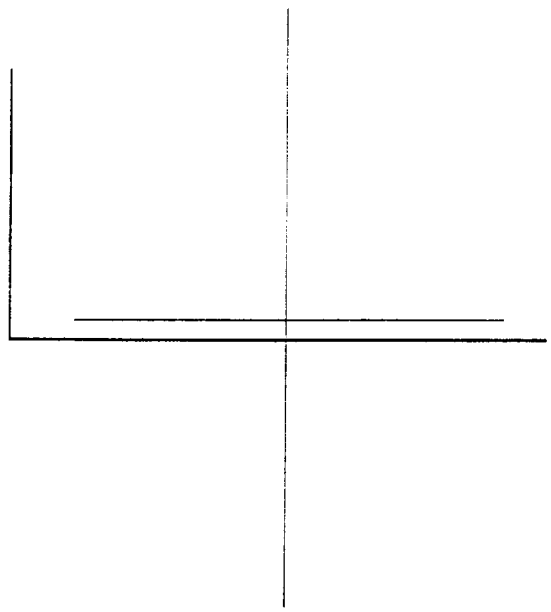
Figure 9C:
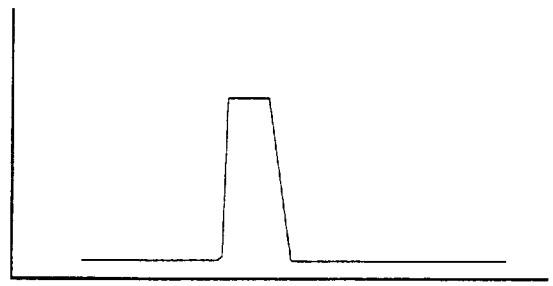
FIG. 9c is an illustration of the histogram of the normalized labeled projection of FIG. 8b.
Figure 9D:
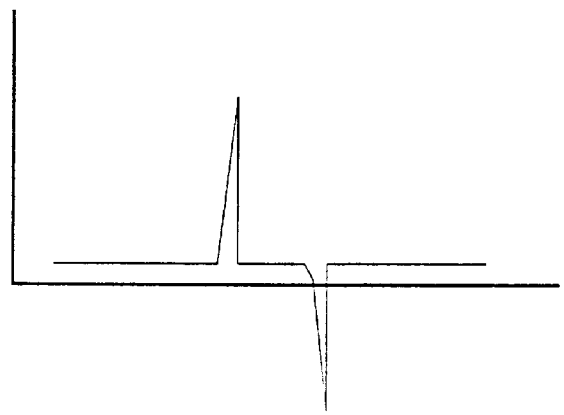
FIG. 9d is an illustration of the first derivative of FIG. 9c.
Figure 9E:
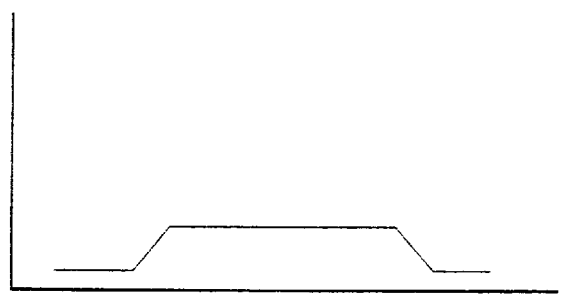
FIG. 9e is an illustration of the histogram of the normalized labeled projection of FIG. 8c.
Figure 9F:
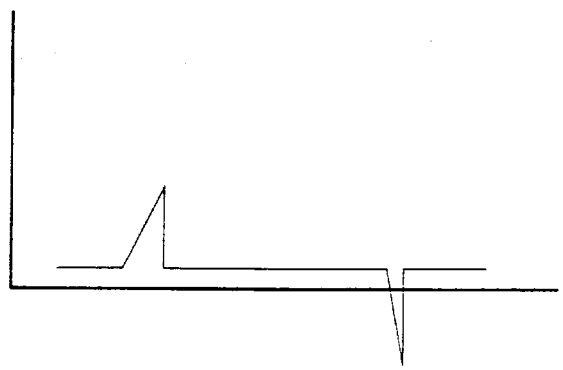
FIG. 9f is an illustration of the first derivative of FIG. 9e.

The invention is further illustrated by considering the shape of the histogram and its first derivative when the labeled-projection model and image are in three relationships. FIG. 8*a* illustrates an image containing a circle 800 enclosed by a window 840 with a labeled-projection model 810 placed so that the circle 800 is concentric with the annulus of the labeled-projection model 810. FIG. 9*a* illustrates that this relationship will yield a histogram having a sharp peak at the bin that is coincident with the center of the circle 800. FIG. 9*b* illustrates that the magnitude of the first derivative of the histogram of FIG. 9*a* is large. FIG. 8*b* illustrates that same image containing the circle 800 with a labeled-projection model 820 placed at the correct x-position, but at too low a y-position. There are still some parts of the circular image that are within the annulus of the labeled-projection model 820, but the co-incidence is not complete and the effect in a histogram is not as pronounced as the coincident case. FIG. 9*c* illustrates that the histogram created by the projection has a broader, lower peak. The resulting first derivative illustrated in FIG. 9*d* does not have as large a magnitude as when the circles of the labeled-projection model and the image are concentric. FIG. 8*c* illustrates the same image containing circle 800 with a labeled-projection model 830 displaced from the center in both the x and y-axes. FIG. 9*e* illustrates how the histogram created by this projection is significantly broader and lower than the are the other histograms illustrated in FIGS. 9*a* and 9*c*. Consequently, the first derivative of FIG. 9*e*, shown in FIG. 9*f*, has much smaller peaks than the more closely aligned orientations.

Figure 10:
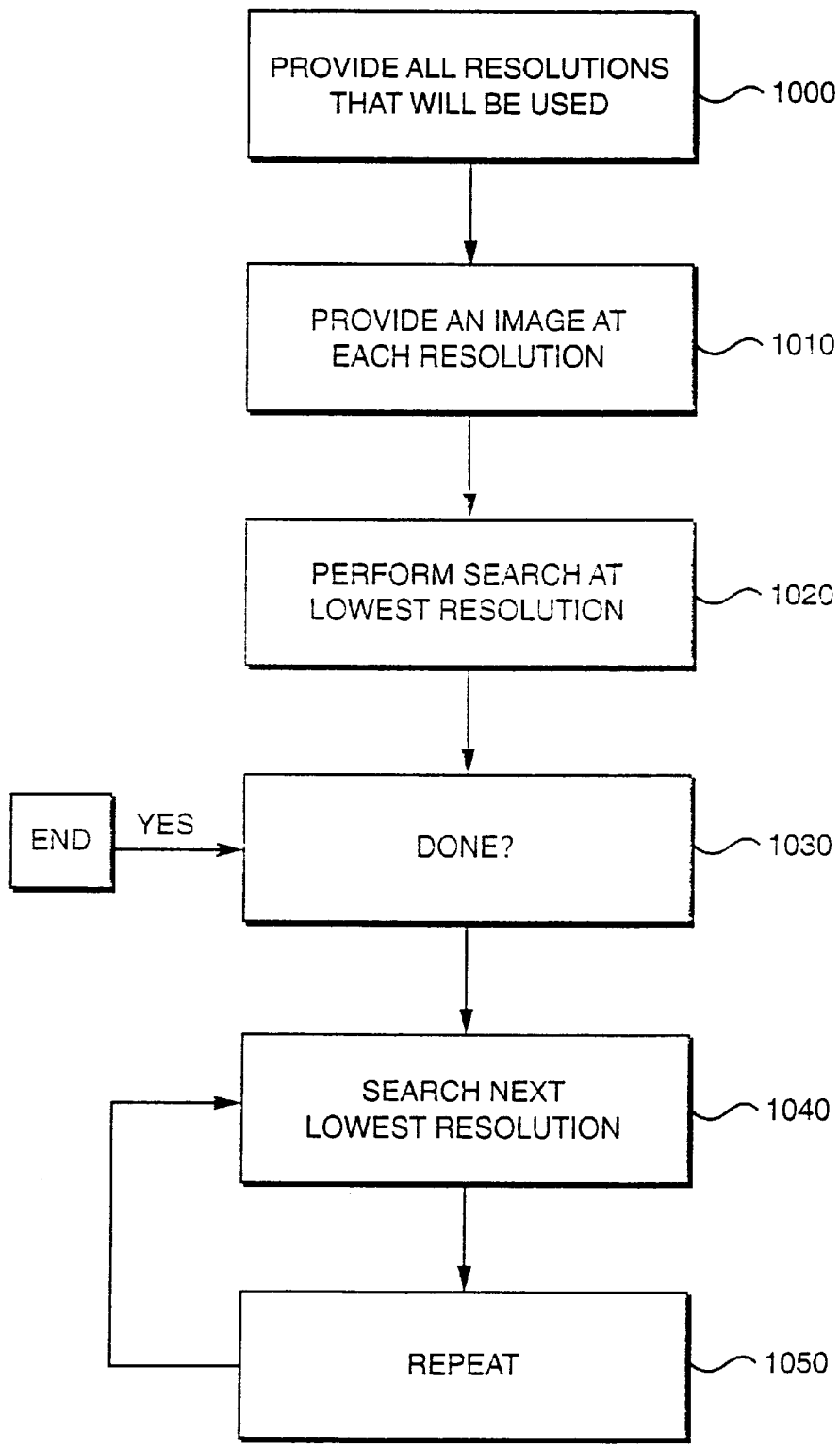
FIG. 10 is a flowchart of a search method of one embodiment of the invention that searches at a plurality of resolutions.

FIG. 10 illustrates the steps of the method of an alternative run-time implementation of the invention that searches at a plurality of resolutions in which reference numbers in parenthesis are denoted to show steps of operation. A reduced-resolution image has fewer pixels, and thus requires less computation Consequently, the higher-resolution images are not searched if a sufficient result is achieved using only the reduced-resolution images, as will be described the first step is for the operator to provide the resolutions of the images that will be searched (1000). At each resolution searched, an image at that resolution is provided (1010). The appropriate resolution image is generated by reducing the image after acquisition by methods such as low-pass filtering and sub-sampling, for instance. The image is reduced preferably by methods that retain the features of the larger image, but occupy less image space. Alternatively, the image is acquired at a reduced resolution, thereby eliminating the time taken to perform processing, such as sub-sampling. In a preferred embodiment of the invention, the images are acquired at a fourth of the full resolution.

As a lower-resolution image takes less time to search than a higher-resolution image, the lowest-resolution image is searched first. A labeled-projection model compatible with the resolution of the image is produced, projected and normalized, thereby generating a histogram. A maximum of the histogram's first derivative is defined and stored as previously described. Next, the labeled-projection model is moved relative to the image and the process is repeated until each possible position of the labeled-projection model relative to the image has been tried as in an exhaustive search. A possible reference point is generated corresponding to the largest of the maximum absolute values derived from the labeled projection of the lowest-resolution image (1020).

At this point, the search is terminated if the possible reference point is accurate enough for the application requirements or if there are no more resolutions of the image to search (1030). However, if the reference point is not accurate enough and another resolution of the image is available to search, then the next lowest-resolution image is searched (1040).

The search area of the higher-resolution search is restricted by using the possible reference point generated by the lower-resolution search in conjunction with the operator supplied radii parameters. For example, the search are may be restricted to within a few pixels of the lower resolution starting point. The restriction saves time. The restricted search over this area is resumed using the higher-resolution image and a compatible higher-resolution labeled-projection model. Again, the center of the labeled-projection model at the position that corresponds to the largest of the absolute maximum values is reported as the center of the object profile.

The search is repeated until all the resolutions available have been searched or until the desired accuracy is achieved (1050). The multi-resolution embodiment described, however, still performs an area search to move the labeled-projection model to its next position, and thus contributes to performance time.

Figure 11:
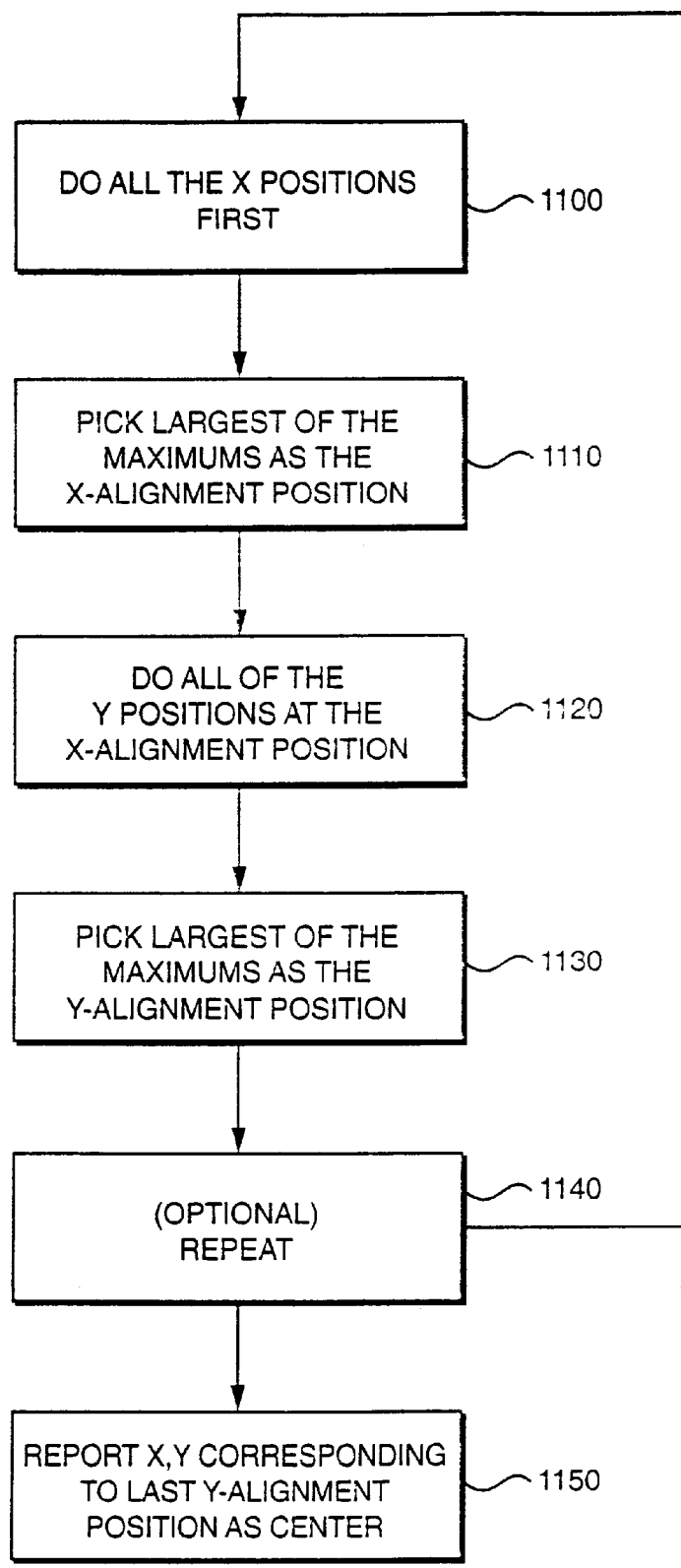
FIG. 11 is a flowchart of a preferred embodiment of the invention for finding the center of container profiles.

In contrast, a preferred method transforms the movement of the labeled-projection model to its next position from an area search, which is a search of a rectangular portion of the image, into two or more line searches. A line search moves the labeled-projection model to a next position only along a specified line segment within the image. Thereby, the preferred method achieves enhanced performance times when finding the center of the object profile. An instance of the preferred embodiment is illustrated in FIG. 11 where the reference numerals in parenthesis denote steps of the method.

To perform the two or more lines searches, a y-position within the image is held constant while the normalized labeled projection is performed at each x-position across the image, and the maximum absolute value of the first derivative of the histogram is noted (1100). At the end of the traverse, the largest of the maximums is chosen as the x-alignment position (1110). Then, the x-position corresponding to the x-alignment position is held constant, while the search is performed in the y-direction. Again, for each y-position, the maximum absolute value of the first derivative of the histogram generated by the normalized labeled projection is noted (1120). The largest of the maximums indicates a y-alignment position (1130). Optionally, the process could be repeated (1140) holding the y-position constant at the y-alignment position until a predefined termination condition was met, such as when non-convergence is established or when the change measured in pixels between successive y-alignment positions is within a predefined tolerance. In the instance of convergence, the additional traverses will further refine the y-location, the x-location or both. Finally, the position of the center of the labeled-projection model that corresponds to the last y-alignment position is reported as the center of the container profile (1150).

The preferred method enhances the process by decreasing the applications of the normalized labeled projection. For example, an exhaustive area search of the 9 by 9 image as is illustrated in FIG. 6a would require 81 applications of the projection, while the line approach can require only 18 applications of the projection.

While the preferred method described holds the y-location constant first and the x-location constant second, a one dimensional search method can be applied whenever enough knowledge of the position of the image is known so as to assure that me labeled-projection model will traverse the object profile using an initial constant dimension. The probability of traversing the object profile is increased when using a reduced-resolution image because the possible x and y locations are decreased. Therefore, it is more likely that appropriate initial dimension is chosen when the image is a reduced-resolution image.

Also in the preferred embodiment, the normalized labeled projection is performed on every third pixel. Thus, decreasing even further the number of calculations required. This sampling approach can be generalized depending on the frequency of edges in the image. For example, the image can be sampled every other or every fourth pixel, rather than every third.

Any improvement that increases the speed of processing without degrading the quality of the result improves the utility of a method for aligning an object. To increase speed, the preferred method decreases the number of times the labeled-projection model moves, step (540) in FIG. 5. Speed can also be enhanced by decreasing the area of the image over which the normalized labeled projection must be performed, step (520) of FIG. 5 because the decrease in area reduces the number of computations to be performed. As illustrated in FIG. 12 smaller windows can reduce the area of the image over which the normalized labeled projection must be performed.

The window(s) are defined so that the distinguishing characteristics of the object profile are represented in the window(s). The embodiments previously described were a special case where one window surrounded the entire image. The one-window configuration always encompassed the distinguishing characteristics and, therefore, allowed the object profile to be accurately found. The multiple windows are also defined so that that the distinguishing characteristics of the labeled-projection model are represented within the windows. In FIG. 12, the distinguishing characteristic of the shape of a labeled-projection model 1220 is the similar curvature of the uniformly labeled elements within the radii of the inner circle and outer circle. The windows 1200 encompass the curvature of all of the radii r, that satisfy the relation $r_1 < r < r_2$ and are positioned to provide enough information to identify a circular image. Thus, the windows 1200 both allow accuracy and decrease the computational time.

When projecting the image within the multiple windows, the normalized labeled projection is performed for each pixel represented by a label location in a window for each window, yielding a single one-dimensional histogram for that position of the labeled-projection model relative to the image. If a pixel location 1210 is encompassed by more than one window 1200, it will contribute to the result of projecting the labeled-projection model 1220 on the image both times. Overlapping windows may be needed to cover adequately the distinguishing features of the object profile. Next, the labeled-projection model 1220 and the windows 1200 are moved to the next location relative to the image and then the normalized labeled projection is performed again and the center of the object profile is located as previously described.

Figure 13A:
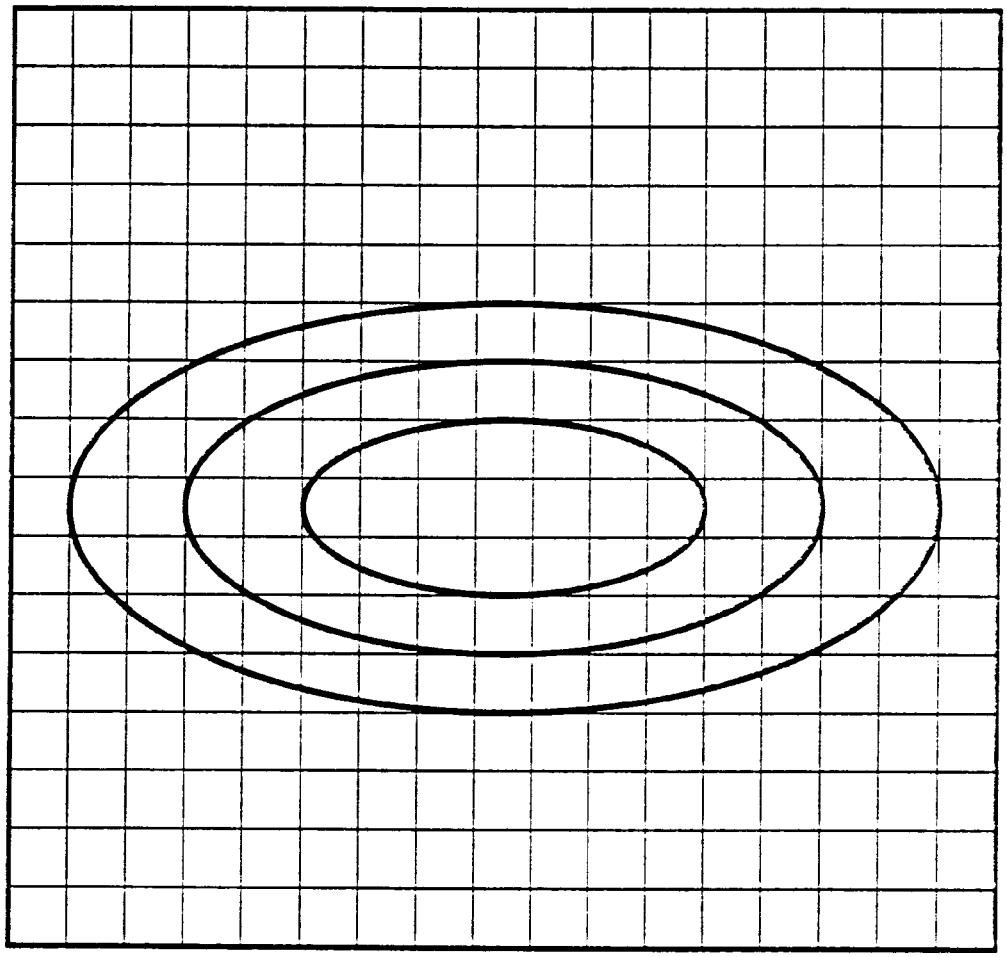
FIGS. 13a and 13b are illustrations of various profiles of objects that could be found using the method of the invention.
Figure 13B:
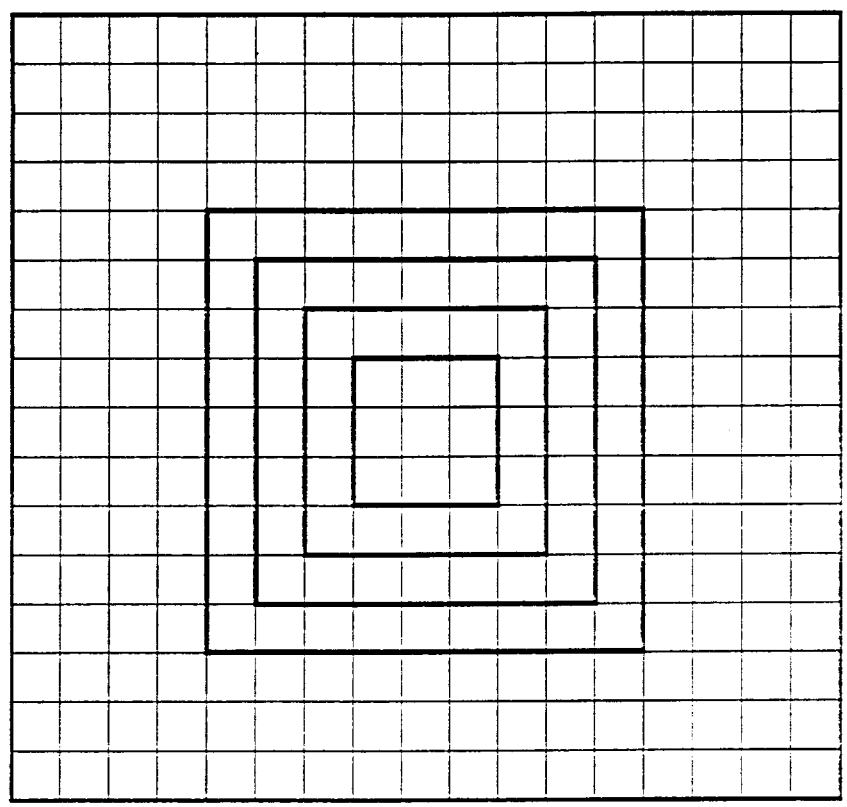

While the method of the invention has been illustrated using round containers and round labeled-projection models as an illustration, this invention is applicable to any shape that is amenable to concentric labeled-projection models. FIGS. 13a and 13b illustrate two other shapes whose center could be found by the invention. When specification of the shape does not use a single radius, the concentric shapes can be specified by a set of vectors from the center of the object. The labeled-projection models can include don't care pixel as necessary among the concentric outlines and segmenting the outlines as appropriate. Windowing for each of these shapes can be accomplished for efficiency of search.

Further, while the focus has been on finding the center of the object profile and finding the radius of the object profile, as should be appreciated other attributes of the object can be found using any of the positional information generated by the method of the invention, not just the center or radius of the object profile.

Other modifications and implementations will occur to those skilled in the art without departing from the spirit and the scope of the invention as claimed. Accordingly, the above description is not intended to limit the invention except as indicated in the following claims.

What is claimed is:

1. A method for determining a position of a reference point with respect to a bottle bottom within an image, the method comprising:

generating a labeled-projection model of the bottle bottom, the labeled-projection model having a plurality of uniform labels, each uniform label of the plurality of uniform labels representing one of a plurality of potential scales of the bottle bottom;

acquiring the image of the bottle bottom;

performing labeled-projection on the image using the labeled-projection model at each of a plurality of positions in the image so as to provide a plurality of histogram maxima;

determining a peak of the plurality of histogram maxima; and using a position of the labeled-projection model corresponding to the peak to provide the position of the reference point with respect to the bottle bottom.

2. The method of claim 1, wherein generating the labeled-projection model further includes:

generating the labeled-projection model such that the labeled-projection model has a resolution that almost matches a resolution of the image.

3. The method of claim 1, wherein generating the labeled-projection model further includes:

arranging each of the uniform labels of the plurality of uniform labels in a concentric relationship with one another.

4. The method of claim 3, wherein the plurality of uniform labels are arranged in concentric circles.

5. The method of claim 3, wherein the plurality of uniform labels are arranged in concentric ellipses.

6. The method of claim 1, wherein the bottle bottom has an unknown size.

7. The method of claim 1, wherein patterns of the plurality of uniform labels are related to the bottle bottom, and wherein at least one dimension of at least one of the patterns is substantially greater than a maximum dimension of the bottle bottom.

8. The method of claim 1, wherein the bottle bottom has an unknown radius r, the r being a value substantially between a maximum radius $r_2$ and a minimum radius $r_1$, and wherein generating the labeled-projection model further includes:

generating an annulus having a radius $r_m$, that satisfies an equation $r_2 \geq r_m \geq r_1$ to provide the labeled-projection model.

9. The method of claim 1, wherein acquiring the image further includes:

acquiring the image at a reduced resolution.

10. The method of claim 1, wherein performing labeled-projection further includes:

performing normalized labeled-projection.

11. The method of claim 10, wherein each histogram maxima of the plurality of histogram maxima correspond to each of the plurality of positions in the image for the labeled-projection model.

12. The method of claim 11, wherein generating the labeled-projection model further includes:

windowing the labeled-projection model with windows so that the windows enclose a distinguishing characteristic of the labeled-projection model, the labeled-projection model and the windows having a relative relationship to one another, and wherein performing labeled-projection further includes:

performing labeled-projection on the image within the windows using the labeled-projection model at each of a plurality of positions in the image so as to provide a plurality of histogram maxima.

13. The method of claim 11, where determining the peak further includes:

selecting as the peak a greatest histogram maxima of the plurality of histogram maxima.

14. The method of claim 11, wherein performing the normalized labeled-projection further includes:

defining an approximate first derivative of a histogram at each of the plurality of position in the image and evaluating a maximum absolute value of the approximate first derivative to provide the plurality of histogram maxima.

15. The method of claim 11, wherein performing the normalized labeled-projection further includes:

defining an approximate first difference of a histogram at each of the plurality of position in the image and evaluating a maximum absolute value of the approximate first difference to provide the plurality of histogram maxima.

16. The method of claim 11, for efficiently determining a dimensional parameter of the bottle bottom further comprising:

measuring the dimensional parameter using the reference point.

17. The method of claim 11, wherein performing the normalized labeled-projection further includes:

selecting as a portion of the plurality of positions along a first line in the image for the labeled-projection model and performing normalized labeled-projection with the labeled-projection model at each of the positions along the first line so as to generate a first set of the plurality of histogram maxima;

determining an approximate largest one of the first set of the plurality of histogram a maxima;

designating as first coordinate pair an origin of the labeled-projection model corresponding to a position along the first line having the approximate largest one of the first set of the plurality of histogram maxima; and selecting as a portion of the plurality of positions along a second line in the image for the labeled-projection model, the second line being substantially orthogonal to the first line, wherein the positions along the second line have a coordinate equal to one of the first coordinate pair, and performing normalized labeled-projection with the labeled-projection model at each of the positions along the second line so as to generate the plurality of histogram maxima.

18. An apparatus for determining a position of a reference point with respect to a bottle bottom within an image, the apparatus comprising:

modeling means, adapted to generate a labeled-projection model of the bottle bottom, the labeled-projection model having a plurality of uniform labels, each uniform label of the plurality of uniform labels representing one of a plurality of potential scales of the bottle bottom;

an image of the bottle bottom;

projection means, in cooperation with the modeling means, adapted to perform labeled-projection on the image using the labeled-projection model at each of a plurality of positions in the image so as to provide a plurality of histogram maxima;

peak means, in cooperation with the projection means, adapted to determine a peak of the plurality of histogram maxima; and positioning means, in cooperation with the peak means and the projection means, adapted to use a position of the labeled-projection model corresponding to the peak to provide the position of the reference point with respect to the bottle bottom.

19. The apparatus of claim 18, wherein the bottle bottom has an unknown radius r, the r being a value substantially between a maximum radius $r_2$ and a minimum radius $r_1$, and wherein the modeling means is further adapted to generate an annulus having a radius $r_m$, that satisfies an equation $r_2 \geq r_m \geq r_1$ to provide the labeled-projection model.

20. The apparatus of claim 18, wherein patterns of the plurality of uniform labels are related to the bottle bottom, and wherein at least one dimension of at least one of the patterns is substantially greater than a maximum dimension of the bottle bottom.

21. The apparatus of claim 1, wherein the model means is further adapted to arrange each of the uniform labels of the plurality of uniform labels in a concentric relationship with one another.

22. The apparatus of claim 18, wherein the bottle bottom has an unknown size.

23. The apparatus of claim 18, wherein the projection means is further adapted to perform normalized labeled-projection.

24. The apparatus of claim 23, wherein the projection means further includes:

first selecting means, adapted to select as a portion of the plurality of positions along a fist line for the labeled-projection model at which the projection means performs normalized labeled-projection with the labeled-projection model at each of the plurality of positions along the first line so as to generate a first set of the plurality of histogram maxima;

determining means, in cooperation with the first selecting means, adapted to determine an approximate largest one of the first set of the plurality of histogram maxima;

designating means, in cooperation of with the determining means, adapted to designate as first coordinate pair an origin of the labeled-projection model corresponding to a position along the first line having the approximate largest one of the first set of the plurality of histogram maxima; and second selection means, in cooperation with the designating means and the first selecting means, adapted to select as a portion of the plurality of positions along a second line in the image for the labeled-projection model, the second line being substantially orthogonal to the first line, wherein the positions along the second line have a coordinate equal to one of the first coordinate pair, at which the projection means performs normalized labeled-projection with the labeled-projection model at each of the positions along the second line so as to generate the plurality of histogram maxima.

25. The apparatus of claim 23, wherein the modeling means further includes:

windowing means, in cooperation with the model means, adapted to window the labeled-projection model so at least one window of the windows encloses a distinguishing characteristic of the labeled-projection model, the labeled-projection model and the windows having a relative relationship to one another, and wherein the projection means, in cooperation with the windowing means, is further adapted to perform labeled-projection on the image within the windows using the labeled-projection model at each of a plurality of positions in the image so as to provide a plurality of histogram maxima.

26. The apparatus of claim 23, wherein projection means further includes a derivative means adapted to define an approximate first derivative of a histogram at each of the plurality of position in the image and evaluate a maximum absolute value of the approximate first derivative to provide the plurality of histogram maxima.

27. The apparatus of claim 23, wherein projection means further includes a first difference means adapted to define an approximate first difference of a histogram at each of the plurality of position in the image and evaluate a maximum absolute value of the approximate first difference to provide the plurality of histogram maxima.

28. The apparatus of claim 23, for efficiently determining a dimensional parameter of the bottle bottom, the apparatus further comprising:

measuring means, in cooperation with the positioning means and the projection means, adapted to measure the dimensional parameter using the reference point.

29. A method for determining a reference position of a bottle bottom within an image, the image represented by a rectangular array of pixels, each of the pixels having a value, the method comprising:

a. generating a labeled-projection model having a plurality of uniform labels, a pattern of each uniform label of the plurality of uniform labels related to the bottle bottom;

b. acquiring the image of the bottle bottom;

c. defining at least one window so as to enclose at least a portion of the image;

d. defining a starting location for the labeled-projection model in the image;

e. generating a histogram using the labeled-projection model, the histogram representing portions of the image enclosed by the windows of the labeled-projection model;

f. evaluating the histogram for frequency changes;

g. recording a maximum absolute value of the frequency changes;

h. selecting at least one next position for the labeled-projection model and the at least one window, while maintaining the relative relationship between the labeled-projection model and the windows, and for said next position applying the steps e–g with the labeled-projection model and the windows at said next position; and i. determining an origin of the labeled-projection model corresponding to a position of the labeled-projection model having an approximate largest of the maximum absolute value of the frequency changes, thereby providing the reference position of the bottle bottom.

30. The method of claim 29, wherein the bottle bottom has an unknown size.

31. The method of claim 29, wherein generating the labeled-projection model further includes:

arranging the plurality of uniform labels in a concentric relationship with one another.

32. The method of claim 29, wherein the bottle bottom has an unknown radius r, the r being a value between a maximum radius $r_2$ and a minimum radius $r_1$, and wherein generating the labeled-projection model includes:

generating an annulus for the pattern, the annulus having a radius $r_m$, that satisfies an equation $r_2 \geq r_m \geq r_1$ to provide the labeled-projection model.

33. The method of claim 29, wherein acquiring the image includes:

acquiring the image at a reduced resolution.

34. The method of claim 29, wherein defining the at least one window further includes:

defining the at least one window so as to enclose portions of the labeled-projection model, at least one of the at least one window being defined so as to also enclose a distinguishing characteristic of the labeled-projection model, the labeled-projection model and the windows having a relative relationship to one another; and wherein selecting further includes:

selecting at least one next position for the labeled-projection model and the at least one window, while maintaining the relative relationship between the labeled-projection model and the windows, and for said next position applying the steps e–g with the labeled-projection model and the windows at said next position.

35. The method of claim 29, wherein generating the histogram further includes:

normalizing the histogram.

36. The method of claim 35, wherein a uniform label of the plurality of uniform labels is a don't care label, and wherein generating the histogram further includes:

summing an intensity of pixels in the image within the windows corresponding to uniform labels other than don't care label.

37. The method of claim 35, wherein evaluating the histogram further includes:

defining an approximate first derivative of the histogram, and evaluating a maximum absolute value of the approximate first derivative.

38. The method of claim 35, wherein selecting at least one next position further includes:

selecting positions along a first line in the image as the at least one next position for the labeled-projection model and applying the steps e–g with the labeled-projection model at each said next position so as to generate a first set of maximum absolute values;

determining an approximate largest one of the first set of maximum absolute values;

designating as first coordinate pair the origin of the labeled-projection model corresponding to a position along the first line having the largest of the first set of maximum absolute values; and selecting positions along a second line in the image as at least one next position for the labeled-projection model, the second line being substantially orthogonal to the first line, wherein the positions along the second line have a coordinate equal to one of the first coordinate pair, and applying the steps e–g with the labeled-projection model at each said next position.

39. The method of claim 35, for efficiently determining a dimensional parameter of the bottle bottom further comprising:

measuring the dimensional parameter using the reference position.

* * * * *